United States Patent
Chen et al.

(10) Patent No.: US 9,042,689 B2
(45) Date of Patent: May 26, 2015

(54) OPTICAL SWITCH AND OPTICAL SWITCH ARRAY

(75) Inventors: Qinghua Chen, Shenzhen (CN); Haixia Zhang, Shenzhen (CN); Wengang Wu, Shenzhen (CN); Jun Zhao, Shenzhen (CN); Yunsheng Wen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 321 days.

(21) Appl. No.: 13/603,025

(22) Filed: Sep. 4, 2012

(65) Prior Publication Data

US 2013/0243372 A1  Sep. 19, 2013

Related U.S. Application Data

(63) Continuation-in-part of application No. PCT/CN2011/074497, filed on May 23, 2011.

(30) Foreign Application Priority Data

May 27, 2010 (CN) .......................... 2010 1 0190130

(51) Int. Cl.
*G02B 6/26* (2006.01)
*G02B 6/35* (2006.01)
(Continued)

(52) U.S. Cl.
CPC ............. *G02B 6/3584* (2013.01); *C22F 1/006* (2013.01); *G02B 26/0841* (2013.01); *G02B 26/0866* (2013.01); *G02B 6/358* (2013.01); *G02B 7/1827* (2013.01); *G02B 26/0833* (2013.01)

(58) Field of Classification Search
CPC ........... G02B 26/0841; G02B 26/0866; G02B 26/0833; C22F 1/006
USPC ............ 385/14–15, 16, 18; 359/196.1, 197.1, 359/198.1, 199.1, 199.2, 199.3, 199.4, 359/201.2, 212.1, 212.2, 213.1, 214.1
See application file for complete search history.

(56) References Cited

U.S. PATENT DOCUMENTS 5,969,465 A    10/1999  Neukermans et al.
6,072,617 A *   6/2000  Henck ........................... 359/237
(Continued)

FOREIGN PATENT DOCUMENTS

CN      1371007 A      9/2002
CN      1423755 A      6/2003
(Continued)

OTHER PUBLICATIONS

International Search Report dated Sep. 1, 2011 in connection with International Patent Application No. PCT/CN2011/074497.
(Continued)

*Primary Examiner* — Ryan Lepisto
*Assistant Examiner* — Guy Anderson

(57) ABSTRACT

An optical switch includes: a semiconductor substrate, including a first rotation part and a first torsion beam disposed at two ends of the first rotation part, where the first torsion beam is configured to drive the first rotation part to rotate; a microreflector, disposed on a surface of the first rotation part of the semiconductor substrate; a first latching structure, disposed on a surface of the first torsion beam, the first latching structure including a form self remolding (FSR) material layer and a thermal field source, where the thermal field source is configured to provide a thermal field for the FSR material layer and the FSR material layer is configured to undergo form remolding under the thermal field, so as to latch the first rotation part and the microreflector in a position after rotation.

19 Claims, 3 Drawing Sheets

(51) Int. Cl.
*G02B 7/182* (2006.01)
*C22F 1/00* (2006.01)
*G02B 26/08* (2006.01)

(56) References Cited

U.S. PATENT DOCUMENTS

| | | | |
|---|---|---|---|
| 6,360,036 | B1 | 3/2002 | Couillard |
| 6,442,307 | B1 * | 8/2002 | Carr et al. ............... 385/18 |
| 6,469,821 | B2 * | 10/2002 | Bartlett et al. ........... 359/292 |
| 7,142,743 | B2 | 11/2006 | Bernstein |
| 7,242,825 | B2 | 7/2007 | Lin et al. |
| 7,990,595 | B1 * | 8/2011 | Chou et al. ............ 359/198.1 |
| 8,599,463 | B2 * | 12/2013 | Wu et al. ................ 359/234 |
| 2002/0118084 | A1 | 8/2002 | Lim et al. |
| 2003/0031221 | A1 * | 2/2003 | Wang et al. .............. 372/45 |
| 2003/0174934 | A1 | 9/2003 | Ishii et al. |
| 2006/0171015 | A1 * | 8/2006 | Nanjyo et al. ............ 359/290 |
| 2007/0216986 | A1 * | 9/2007 | Huber et al. ............. 359/245 |
| 2011/0194164 | A1 * | 8/2011 | Chou et al. ............. 359/200.6 |
| 2012/0327493 | A1 * | 12/2012 | Koide et al. ............ 359/199.2 |

FOREIGN PATENT DOCUMENTS

| | | |
|---|---|---|
| CN | 1472556 A | 2/2004 |
| CN | 1969217 A | 5/2007 |
| CN | 100451725 C | 1/2009 |
| EP | 0 848 265 A2 | 6/1998 |
| JP | 2003066346 A | 3/2003 |
| WO | WO 01/51973 A1 | 7/2001 |

OTHER PUBLICATIONS

Written Opinion of the International Searching Authority dated Sep. 1, 2011 in connection with International Patent Application No. PCT/CN2011/074497.

Supplementary European Search Report dated Mar. 6, 2013 in connection with European Patent Application No. EP 11 78 6064.

* cited by examiner

OPTICAL SWITCH AND OPTICAL SWITCH ARRAY

CROSS-REFERENCE TO RELATED APPLICATION

This application is a continuation in part of International Application No. PCT/CN2011/074497, filed on May 23, 2011, which claims priority to Chinese Patent Application No. 201010190130.8, filed on May 27, 2010, both of which are hereby incorporated by reference in their entireties.

TECHNICAL FIELD

The present invention relates to optical communication technologies, and more particularly, to an optical switch and an optical switch array which are applicable in an optical communication system.

BACKGROUND

Ina conventional communication network, a transmission medium may be classified into two types: wired and wireless. A wireless transmission medium mainly includes a microwave line and a synchronous satellite line, and a wired transmission medium mainly includes a copper cable and an optical fiber cable. After the digital communication era comes, the copper cable cannot meet the requirements of the rapid development of digital communication due to the limitation of information capacity of the copper cable. The optical fiber cable has an information capacity several orders of magnitude greater than that of the copper cable. Therefore, the optical communication technology using the optical fiber cable as the transmission medium attracts more and more attentions of the industry.

The development of the optical communication technology poses higher and higher requirements on the performance of optical switches in an optical communication system. The optical switches are key components that are used to perform channel switching for optical signals in optical transmission lines, and may be widely used to implement functions such as route selection, wavelength selection, and optical cross-connection of an all-optical layer. Optical switches mainly include mechanical optical switches and waveguide optical switches. An optical switch based on the micro-electro-mechanical system (MEMS), hereinafter referred. The MEMS optical switches are becoming the mainstream of the optical switch technology because of the advantages such as low insertion loss, low power consumption, independence of wavelength and modulation mode, long life, and high reliability.

Ina conventional MEMS optical switch, a micro-mirror is placed above a semiconductor substrate (for example, a silicon substrate) by using a semiconductor manufacturing process. The micro-mirror can be set movably through a micromechanical structure so that the electronic, mechanical and optical functions are integrated in a chip. The basic working principle of the MEMS optical switch is as follows: the electrostatic or electromagnetic force drives the movable micromirror to ascend and descend, rotate, or move, so that an optical path is turned on or off by changing the light transmission direction.

In an existing MEMS optical switch, the latching of the optical switch status is generally implemented through a mechanical structure that uses the gear engagement or a combination of a clip and a buckle. However, the latching structure is complicated and occupies an unduly large chip area. Therefore, for the existing MEMS optical switch, it is difficult to implement an optical switch array with a plurality of micromirror arrays on a chip. In other words, it is difficult to achieve the large-scale integration.

SUMMARY

To solve the problems in the existing techniques, embodiments of the present invention provides an optical switch and an optical switch array.

An optical switch provided in an embodiment of the present invention includes: a semiconductor substrate, including a first rotation part and a first torsion beam disposed at two ends of the first rotation part, where the first torsion beam is configured to drive the first rotation part to rotate; a microreflector, disposed on a surface of the first rotation part of the semiconductor substrate; a first latching structure, disposed on a surface of the first torsion beam, the first latching structure including a form self remolding (FSR) material layer and a thermal field source, where the thermal field source is configured to provide a thermal field for the FSR material layer, and the FSR material layer is configured to undergo form remolding under the thermal field, so as to latch the first rotation part and the microreflector in a position after rotation.

An optical switch array provided in an embodiment of the present invention includes a glass substrate and a plurality of optical switch units disposed on the glass substrate. The optical switch unit includes a semiconductor substrate, including a rotation part and a torsion beam disposed at two ends of the rotation part, where the first torsion beam is configured to drive the first rotation part to rotate; a microreflector, disposed on a surface of the rotation part of the semiconductor substrate; a latching structure, disposed on a surface of the torsion beam and including a form self remolding (FSR) material layer, where the FSR material layer is configured to undergo form remolding under an internal integrated thermal field of the optical switch unit, so as to latch the first rotation part and the microreflector in a position after rotation.

For the optical switch and the optical switch array according to the embodiments of the present invention, a form self remolding (FSR) material is used in the latching structure of the optical switch, and the FSR material is used for latching the status after the switching status of the optical switch is changed. Because the FSR material features deformation memory and structure remolding, the status latching of the optical switch may be easily implemented, and therefore, the optical switch does not need to occupy a large chip area, and large-scale integration of the optical switches can be easily achieved.

BRIEF DESCRIPTION OF THE DRAWINGS

To illustrate the technical solutions according to the embodiments of the present invention more clearly, the accompanying drawings for describing the embodiments are introduced briefly in the following.

DETAILED DESCRIPTION

An optical switch and an optical switch array provided in the embodiments of the present invention are described in detail with reference to specific embodiments.

To solve the problems in the existing techniques, form self remolding (FSR) material is used in a latching structure of an optical switch according to an embodiment of the present invention, and the FSR material is used for status latching after a switching status of the optical switch is changed. Because the FSR material features deformation memory and structure remolding, the status latching of the optical switch may be easily implemented, and therefore, the optical switch does not need to occupy a large chip area, and large-scale integration of the optical switches can be easily achieved.

For example, the optical switch may be an MEMS optical switch. The MEMS optical switch includes a semiconductor substrate having a rotation part and a torsion beam, a microreflector disposed on the surface of the rotation part, and a latching structure disposed on the surface of the torsion beam. The torsion beam may be configured to drive the rotation part to rotate. The latching structure may include an FSR material layer and a thermal field source (for example, a resistive wire). The thermal field source is configured to provide a thermal field for the FSR material layer, and the FSR material layer is configured to undergo form remolding under the effect of the thermal field, so as to latch the rotation part and the microreflector in a position after rotation. For example, in a specific embodiment, the FSR material layer may include an alloy material. The alloy material changes from a solid alloy to a liquid alloy under the effect of the thermal field provided by the thermal field source, and the liquid alloy undergoes form remolding under the excitation of the torsion beam, and solidifies into the solid alloy again after the thermal field is removed.

Figure 1:
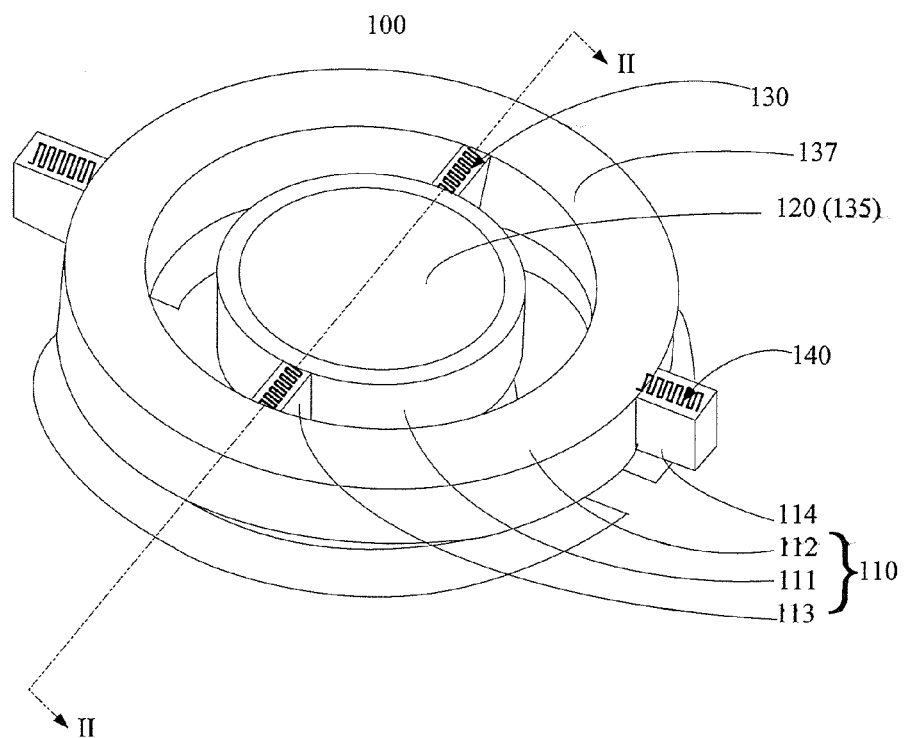
FIG. 1 is a schematic isometric structural diagram of an optical switch according to an embodiment of the present invention.
Figure 2:
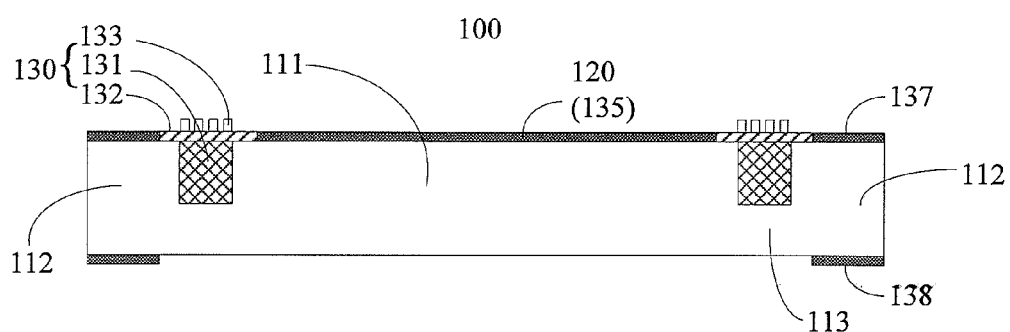
FIG. 2 is a schematic cross-sectional structural diagram of the optical switch of FIG. 1, taken along line II-II.

An optical switch according to a specific embodiment of the present invention is described in detail with reference to FIG. 1 and FIG. 2. Referring to FIG. 1 and FIG. 2, FIG. 1 is a schematic isometric structural diagram of an optical switch according to an embodiment of the present invention, and FIG. 2 is a schematic cross-sectional structural diagram of the optical switch of FIG. 1, taken along line II-II. The optical switch 100 includes a semiconductor substrate 110, a microreflector 120, a first latching structure 130, and a second latching structure 140.

The semiconductor substrate 110 may be a silicon substrate which includes a first rotation part 111, a second rotation part 112, a first torsion beam 113, and a second torsion beam 114. The first rotation part 111 has a round structure with a diameter d1, and the second rotation part 112 has a ring structure with an internal diameter d2 and an external diameter d3. In this embodiment, d1<d2, and the first rotation part 111 is disposed at the central position of the second rotation part 112 and is connected to the second rotation part 112 through the first torsion beam 113. The microreflector 120 may be disposed on the surface of the first rotation part 111.

In a specific embodiment, the first rotation part 111, the second rotation part 112, the first torsion beam 113, and the second torsion beam 114 of the semiconductor substrate 110 may be integrated into one piece. For example, the semiconductor substrate 110 may be a semiconductor layer deposited on a glass substrate surface, and the first rotation part 111, the second rotation part 112, the first torsion beam 113, and the second torsion beam 114 may be formed by performing the photolithographic processing on the semiconductor layer deposited on the glass substrate. The semiconductor layer where the first torsion beam 113 and the second torsion beam 114 are located is thinner than where the first rotation part 111 and the second rotation part 112 are located. In this way, concave portions, for example, grooves, are separately formed in the first torsion beam 113 and the second torsion beam 114 of the semiconductor substrate 110.

The first torsion beam 113 may include two parts, which are referred to as a first beam body and a second beam body in the following. The first beam body and the second beam body extend outwards from external walls of two ends of the first rotation part 111 along the radial direction of the first rotation part 111, and are further connected to corresponding positions on the internal wall of the second rotation part 112. The first torsion beam 113 serves as a torsion beam for the first rotation part 111, and may twist under external excitation so as to drive the first rotation part 111 to rotate with the extension direction of the first torsion beam 113 being a pivot axis direction. Because the microreflector 120 is disposed on the surface of the first rotation part 111, when the first rotation part 111 rotates, the microreflector 120 may be driven to rotate in a same direction. In this way, a position of the microreflector 120 is changed so that a transmission direction of input light may be further switched. For example, by controlling a rotate angle of the first torsion beam 113, the microreflector 120 may be controlled to reflect or not to reflect the input light so that the optical switch 100 may turn on or off an optical path of the input light.

Concave portions are formed in the first beam body and the second beam body of the first torsion beam 113, and the first latching structure 130 may be disposed on the surfaces of the first beam body and the second beam body and are accommodated in the concave portions. The first latching structure 130 may be configured to perform position latching on the first rotation part 111 before and after the rotation so as to implement the latching function of the optical switch 100. In this embodiment, the first latching structure 130 includes a form self remolding (FSR) material layer 131, an insulating layer 132, and a resistive wire 133. The FSR material layer 131 is filled in the concave portions, that is to say, the FSR material layer 131 is embedded inside the first torsion beam 113, the insulating layer 132 covers a surface of the FSR material layer 131, and the resistive wire 133 is deposited on a surface of the insulating layer 132.

The material, that is, FSR material, used in the FSR material layer 131 is a material that may perform deformation memory and structure remolding in an analog mode on a micron/nanometer scale and exist in a form of low melting point alloy, metal or polymer. To facilitate the description, the optical switch 100 is described by taking a low melting point alloy as an example. The low melting point alloy may be melted into a liquid alloy under heating of the resistive wire 133.

Specifically, when the torsion beam 113 drives, under external excitation, the first rotation part 111 (together with the microreflector 120 disposed on the surface of the first rotation part 131) to rotate, applying a current to the resistive wire 133 may make the resistive wire 133 heat and produce a thermal field, where the thermal field may be transferred to the FSR material layer 131 through the insulating layer 132. The FSR material embedded inside the first torsion beam 113, such as the low melting point alloy, changes into a liquid alloy from a solid alloy under the effect of the integrated thermal field provided by the resistive wire 133, and undergoes form remolding under the excitation of the deformation of the torsion beam 113. When the first rotation part 111 rotates to a preset angle and the liquid alloy reaches a required deformation value, the current passing through the resistive wire 133 may be cut off to remove the thermal field. After the thermal field is removed, the liquid alloy solidifies into the solid alloy again after the heat dissipation and cooling. In this way, the first torsion beam 113 and the first rotation part 111 (together with the microreflector 120 disposed on the surface thereof) are latched at the angle after the rotation.

In another aspect, to restore the first rotation part 111 (together with the microreflector 120 disposed on the surface thereof) to the original position, the torsion beam 113 may be made to rotate in an opposite direction through external excitation; at the same time, the current is re-applied to the resistive wire 133 to reproduce the thermal field, so that the low meting point alloy changes into the liquid alloy again and undergoes form remolding. When the first rotation part 111 is restored to the original position, the liquid alloy is restored to the original status. In this case, the current of the resistive wire 133 is cut off to remove the thermal field, which makes the liquid alloy solidify into the solid alloy, and thereby the torsion beam 113 and the first rotation part 111 are latched in the original position.

Referring to FIG. 1 and FIG. 2 again, the structures of the second torsion beam 114 and the second latching structure 140 may be the same as those of the first torsion beam 113 and the first latching structure 130. For example, the second torsion beam 114 may also include two parts. The two parts extend outwards from external walls of two ends of the second rotation part 112 along the radial direction of the second rotation part 112, are further connected to corresponding related external elements (not shown in the drawing), and the extension direction of the second torsion beam 114 may be perpendicular to the extension direction of the first torsion beam 113. The second torsion beam 114 is the torsion beam of the second rotation part 112, and twists under external excitation so as to drive the second rotation part 112 to twist with the extension direction of the second torsion beam 114 as a turning axial direction. Because the first rotation part 111 is connected to the second rotation part 112 through the first torsion beam 113, the turning of the second rotation part 112 may further drive, through the first torsion beam 113, the first rotation part 111 to turn, so that the microreflector 120 is flipped, and thereby the transmission direction of the input light may be controlled from another direction.

The following part describes how the optical switch 100 according to this embodiment switches the transmission direction of the input light. When the microreflector 120 is in the original position, the input light with a transmission direction A may be transmitted along the direction A directly. When the first torsion beam 113 drives the microreflector 120 to rotate to a first preset angle α with the extension direction of the first torsion beam 113 being the pivot axis direction, the optical switch 100 changes the transmission direction of the input light from A to B under the reflection of the microreflector 120 after the rotation. When the second torsion beam 114 drives the microreflector 120 to rotate to a second preset angle β with the extension direction of the second torsion beam 114 being the pivot axis direction, the optical switch 100 changes the transmission direction of the input light from A to C under the reflection of the microreflector 120 after the rotation.

Figure 3:
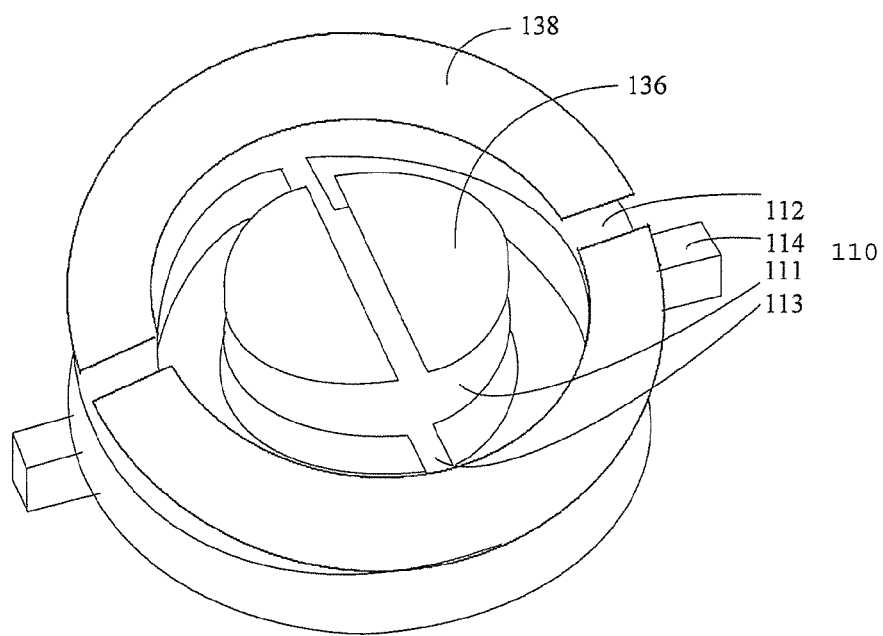
FIG. 3 is a schematic inverted structural diagram of the optical switch of FIG. 1.

Further, referring to FIG. 1 and FIG. 3, FIG. 3 is schematic inverted structural diagram of the optical switch 100 of FIG. 1. The optical switch 100 may further include a plurality of electrodes, such as a first electrode 135 and a second electrode 136 which are disposed on the top and bottom surfaces of the first rotation part 111 respectively, and a third electrode 137 and a fourth electrode 138 which are set on the top and bottom surfaces of the second rotation part 112 respectively. The first electrode 135 and the second electrode 136 are connected to two ends of the resistive wire 133 by means of through holes (not shown in the drawing) formed in the semiconductor substrate 110 and the insulating layer 132. Similarly, the third electrode 137 and the fourth electrode 138 are connected to two ends of the resistive wire in the second latching structure 140 by means of through holes. The resistive wire 133 in the first latching structure 130 receives an external power supply through the first electrode 135 and the second electrode 136 that are set on the top and bottom surfaces of the first rotation part 111, and is driven by the power supply to provide a thermal field for the FSR material layer 131. Similarly, the resistive wire (not shown) in the second latching structure 140 receives an external power supply through the third electrode 137 and the fourth electrode 138 that are set on the top and bottom surfaces of the second rotation part 112, and is driven by the power supply to provide a thermal field for the FSR material layer (not shown) in the second latching structure 140. In a specific embodiment, a metal material with high reflectivity may be used to make the first electrode 135 and the microreflector 120, and the two may be a one-piece structure. In other alternative embodiments, the microreflector 120 may also be formed by polishing silicon material of the first rotation part 111, and the first electrode 135 is disposed on the surface of the first rotation part 111 directly.

According to the technical solution provided by the embodiment of the present invention, the FSR material is used for the latching of the microreflector 120 of the optical switch 100 after the position change. Because the FSR material features deformation memory and structure remolding, the status latching of the optical switch 100 may be easily implemented. Therefore, the optical switch 100 provided by the embodiment of the present invention does not need to occupy a large chip area, and large-scale integration can be easily achieved.

Figure 4:
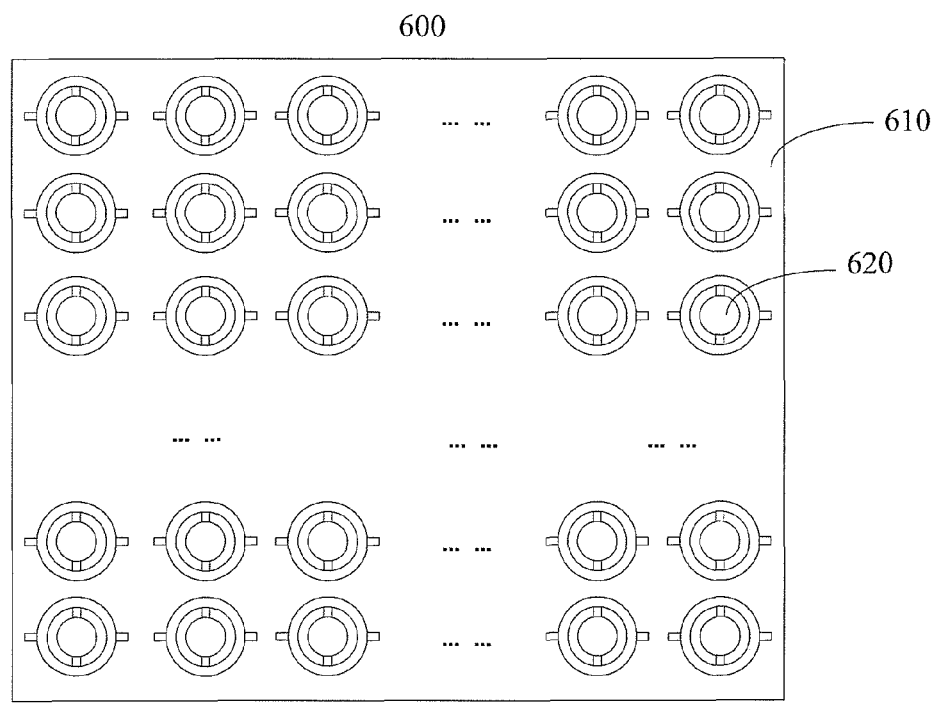
FIG. 4 is a schematic planar structural diagram of an optical switch array according to an embodiment of the present invention.

Based on the optical switch 100 provided by the preceding embodiment, an embodiment of the present invention further provides an optical switch array. Referring to FIG. 4, FIG. 4 is a schematic planar structural diagram of an optical switch array 600 according to an embodiment of the present invention. The optical switch array 600 includes a glass substrate 610 and a plurality of optical switch units 620 disposed on the glass substrate 610. The optical switch 100 provided by the preceding embodiment may be used as the optical switch unit 620, and a plurality of optical switch units 620 are arranged on the surface of the glass substrate 610 in a manner of an M*N matrix. For the specific structure and working process of the optical switch units 620, reference may be made to the preceding embodiment, which is not detailed again herein.

Through the above description of the implementation, persons skilled in the art can clearly understand that the present invention may be accomplished through software plus a necessary universal hardware platform. The above descriptions are merely exemplary embodiments of the present invention, but the protection scope of the present invention is not limited thereto. Any modification or replacement easily thought of by persons skilled in the art within the technical scope disclosed in the present invention should fall within the protection scope of the present invention. Therefore, the protection scope of the present invention is subject to the protection scope of the appended claims.

What is claimed is:
1. An optical switch, comprising:
a semiconductor substrate, comprising a first rotation part and a first torsion beam disposed at two ends of the first rotation part, wherein the first torsion beam is configured to drive the first rotation part to rotate;

a microreflector, disposed on a surface of the first rotation part of the semiconductor substrate; and a first latching structure, disposed on the first torsion beam, the first latching structure comprising a form self remolding (FSR) material layer and a thermal field source, wherein the thermal field source is configured to provide a thermal field for the FSR material layer, and the FSR material layer is configured to undergo foam remolding under the thermal field, so as to latch the first rotation part and the microreflector in a position after rotation;

wherein the FSR material layer comprises a material configured to change from a solid to a liquid under the thermal field provided by the thermal field source, and the liquid undergoes form remolding under excitation of the first torsion beam and solidifies into the solid again after the thermal field is removed.

2. The optical switch according to claim 1, wherein the first rotation part has a round structure, the first torsion beam comprises a first beam body and a second beam body, and the first beam body and the second beam body extend outwards from external walls of two ends of the first rotation part along a radial direction of the first rotation part.

3. The optical switch according to claim 1, wherein the material comprises an alloy.

4. An optical switch array, comprising a glass substrate and a plurality of optical switch units disposed on the glass substrate, wherein each of the optical switch units comprise:

a semiconductor substrate, comprising a first rotation part and a first torsion beam disposed at two ends of the first rotation part, wherein the first torsion beam is configured to drive the first rotation part to rotate;

a microreflector, disposed on a surface of the first rotation part of the semiconductor substrate; and a latching structure, disposed on a surface of the torsion beam, the latching structure comprising a form self remolding (FSR) material layer, wherein the FSR material layer is configured to undergo form remolding under an internal integrated thermal field of the optical switch unit, so as to latch the rotation part and the microreflector in a position after rotation;

wherein the FSR material layer comprises a material configured to change from a solid to a liquid under the thermal field provided by the thermal field source, and the liquid undergoes form remolding under excitation of the first torsion beam and solidifies into the solid again after the thermal field is removed.

5. The optical switch array according to claim 4, wherein the first rotation part has a round structure, the first torsion beam comprises a first beam body and a second beam body, and the first beam body and the second beam body extend outwards from external walls of two ends of the first rotation part along a radial direction of the first rotation part.

6. An optical switch, comprising:

a semiconductor substrate, comprising a first rotation part and a first torsion beam disposed at two ends of the first rotation part, wherein the first torsion beam is configured to drive the first rotation part to rotate;

a microreflector, disposed on a surface of the first rotation part of the semiconductor substrate; and a first latching structure, disposed on the first torsion beam, the first latching structure comprising a form self remolding (FSR) material layer and a thermal field source, wherein the thermal field source is configured to provide a thermal field for the FSR material layer, and the FSR material layer is configured to undergo form remolding under the thermal field, so as to latch the first rotation part and the microreflector in a position after rotation;

wherein the first rotation part has a round structure, the first torsion beam comprises a first beam body and a second beam body, and the first beam body and the second beam body extend outwards from external walls of two ends of the first rotation part along a radial direction of the first rotation part;

wherein the semiconductor substrate has concave portions in the first beam body and the second beam body of the first torsion beam, and the first latching structure is accommodated in the concave portions.

7. The optical switch according to claim 6, wherein the thermal field source is a resistive wire, the semiconductor substrate further comprises a first electrode and a second electrode which are set on top and bottom surfaces of the first rotation part respectively, and the first electrode and the second electrode are connected to two ends of the resistive wire, and are configured to transfer external power supply to the resistive wire so as to enable the resistive wire to heat and generate the thermal field.

8. An optical switch, comprising:

a semiconductor substrate, comprising a first rotation part and a first torsion beam disposed at two ends of the first rotation part, wherein the first torsion beam is configured to drive the first rotation part to rotate;

a microreflector, disposed on a surface of the first rotation part of the semiconductor substrate; and a first latching structure, disposed on the first torsion beam, the first latching structure comprising a form self remolding (FSR) material layer and a thermal field source, wherein the thermal field source is configured to provide a thermal field for the FSR material layer, and the FSR material layer is configured to undergo form remolding under the thermal field, so as to latch the first rotation part and the microreflector in a position after rotation;

wherein the first rotation part has a round structure, the first torsion beam comprises a first beam body and a second beam body, and the first beam body and the second beam body extend outwards from external walls of two ends of the first rotation part along a radial direction of the first rotation part;

wherein the semiconductor substrate further comprises a second rotation part and a second torsion beam disposed at two ends of the second rotation part, the second rotation part has a ring structure, the first rotation part is disposed in a central position of the second rotation part and is connected to the second rotation part through the first torsion beam, the second torsion beam extends outwards from external walls of two ends of the second rotation part, an extension direction of the second torsion beam is perpendicular to an extension direction of the first torsion beam, and the second torsion beam is configured to drive the second rotation part and the first rotation part to rotate towards another direction.

9. The optical switch according to claim 8, further comprising a second latching part disposed on a surface of the second torsion beam, wherein the second latching part has a structure the same as that of the first latching structure, the second latching structure is configured to latch the first rotation part, the second rotation part and the microreflector in positions after rotation when the first rotation part and the second rotation part are driven by the second torsion beam to rotate.

10. The optical switch according to claim 9, wherein the microreflector reflects the input light to a first preset direction when the microreflector and the first rotation part are driven by the first torsion beam to rotate to a first preset angle, and the microreflector reflects the input light to a second preset direction when the microreflector and the first and second rotation part are driven by the second torsion beam to rotate to a second preset angle.

11. The optical switch according to claim 8, wherein the first rotation part, the second rotation part, the first torsion beam, and the second torsion beam are integrated into one piece, and are formed by performing photolithographic processing on a silicon material, and the first torsion beam and the second torsion beam are thinner than the first rotation part and the second rotation part.

12. The optical switch according to claim 8, wherein the thermal field source is a resistive wire, the semiconductor substrate further comprises a first electrode and a second electrode which are set on top and bottom surfaces of the first rotation part respectively, and the first electrode and the second electrode are connected to two ends of the resistive wire, and are configured to transfer external power supply to the resistive wire so as to enable the resistive wire to heat and generate the thermal field.

13. An optical switch array, comprising a glass substrate and a plurality of optical switch units disposed on the glass substrate, wherein each of the optical switch units comprise:
a semiconductor substrate, comprising a first rotation part and a first torsion beam disposed at two ends of the first rotation part, wherein the first torsion beam is configured to drive the first rotation part to rotate;
a microreflector, disposed on a surface of the first rotation part of the semiconductor substrate; and
a latching structure, disposed on a surface of the torsion beam, the latching structure comprising a form self remolding (FSR) material layer, wherein the FSR material layer is configured to undergo foam remolding under an internal integrated thermal field of the optical switch unit, so as to latch the rotation part and the microreflector in a position after rotation;
wherein the first rotation part has a round structure, the first torsion beam comprises a first beam body and a second beam body, and the first beam body and the second beam body extend outwards from external walls of two ends of the first rotation part along a radial direction of the first rotation part;
wherein the semiconductor substrate has concave portions in the first beam body and the second beam body of the first torsion beam, and the first latching structure is accommodated in the concave portions.

14. The optical switch array according to claim 13, wherein the thermal field source is a resistive wire, the semiconductor substrate further comprises a first electrode and a second electrode which are set on top and bottom surfaces of the first rotation part respectively, and the first electrode and the second electrode are connected to two ends of the resistive wire, and are configured to transfer external power supply to the resistive wire so as to enable the resistive wire to heat and generate the thermal field.

15. An optical switch array, comprising a glass substrate and a plurality of optical switch units disposed on the glass substrate, wherein each of the optical switch units comprise:
a semiconductor substrate, comprising a first rotation part and a first torsion beam disposed at two ends of the first rotation part, wherein the first torsion beam is configured to drive the first rotation part to rotate;
a microreflector, disposed on a surface of the first rotation part of the semiconductor substrate; and
a latching structure, disposed on a surface of the torsion beam, the latching structure comprising a form self remolding (FSR) material layer, wherein the FSR material layer is configured to undergo form remolding under an internal integrated thermal field of the optical switch unit, so as to latch the rotation part and the microreflector in a position after rotation;
wherein the first rotation part has a round structure, the first torsion beam comprises a first beam body and a second beam body, and the first beam body and the second beam body extend outwards from external walls of two ends of the first rotation part along a radial direction of the first rotation part;
wherein the semiconductor substrate further comprises a second rotation part and a second torsion beam disposed at two ends of the second rotation part, the second rotation part has a ring structure, the first rotation part is disposed in a central position of the second rotation part and is connected to the second rotation part through the first torsion beam, the second torsion beam extends outwards from external walls of two ends of the second rotation part, an extension direction of the second torsion beam is perpendicular to an extension direction of the first torsion beam, and the second torsion beam is configured to drive the second rotation part and the first rotation part to rotate towards another direction.

16. The optical switch array according to claim 15, wherein the optical switch unit further comprises a second latching part disposed on a surface of the second torsion beam, wherein the second latching part has a structure the same as that of the first latching structure, the second latching structure is configured to latch the first rotation part, the second rotation part and the microreflector in positions after rotation when the first rotation part and the second rotation part are driven by the second torsion beam to rotate.

17. The optical switch array according to claim 16, wherein the microreflector reflects the input light to a first preset direction when the microreflector and the first rotation part are driven by the first torsion beam to rotate to a first preset angle, and the microreflector reflects the input light to a second preset direction when the microreflector and the first and second rotation part are driven by the second torsion beam to rotate to a second preset angle.

18. The optical switch array according to claim 15, wherein the first rotation part, the second rotation part, the first torsion beam, and the second torsion beam are integrated into one piece, and are formed by performing photolithographic processing on a silicon material, and the first torsion beam and the second torsion beam are thinner than the first rotation part and the second rotation part.

19. The optical switch array according to claim 15, wherein the thermal field source is a resistive wire, the semiconductor substrate further comprises a first electrode and a second electrode which are set on top and bottom surfaces of the first rotation part respectively, and the first electrode and the second electrode are connected to two ends of the resistive wire, and are configured to transfer external power supply to the resistive wire so as to enable the resistive wire to heat and generate the thermal field.

* * * * *